United States Patent Office 2,713,044
Patented July 12, 1955

2,713,044

POLYMERIZATION OF ETHYLENE WITH OZONIDE CATALYSTS

Richard E. McArthur and James S. Logan, Niagara Falls, N. Y., assignors to Olin Mathieson Chemical Corporation, a corporation of Virginia No Drawing. Application June 15, 1951, Serial No. 231,912

6 Claims. (Cl. 260—94.9)

This invention relates to the manufacture of solid polymers of ethylene and more particularly relates to the use of ozonides of unsaturated organic compounds as catalysts for the polymerization of gaseous ethylene.

In the polymerization of gaseous ethylene the purified gas and catalyst are charged to a high pressure autoclave equipped with a stirrer. Pressures of 1,000 to 12,000 pounds or more may be used and preferably about 1500–5000 pounds. Temperatures may range from room temperature to 150° C. or higher. Organic peroxides are commonly employed as catalysts although alternatively gaseous oxygen, introduced with the ethylene, has been proposed as catalyst. Where the catalyst is a peroxide it is commonly added in solution in a suitable solvent, for example, benzene.

It has been found that ozonides of unsaturated organic compounds are particularly useful as catalysts for the polymerization of ethylene under these conditions. In contrast with peroxides, the useful ozonides in general are stable compounds under the usual conditions of preparation and processing and thus provide safety and convenience in handling. They are readily prepared and are specially susceptible to continuous processing since they can be continuously introduced in liquid state into the reaction system in accurately controlled proportions by means of simple pressure proportioning equipment. By contrast, the extreme instability of peroxide catalysts, the present catalysts of commercial choice, requires special precautions in preparation. They are produced only in small production lots in isolated safety areas and special non-sparking equipment must be used. The peroxides are unstable above the melting point and are stored as solids. The useful ozonides are readily prepared by reaction of ozone from the usual ozone generator with the unsaturated organic compound. The unsaturated organic compound may contain up to about 20 carbon atoms and may represent an aliphatic, substituted aliphatic or a cyclic structure. The organic compound should contain about one to four double bonds. Of the ozonides of unsaturated organic compounds however, those containing a high proportion of ozone are of special advantage. Thus ozonides having one or more ozonide groupings to eight or less carbon atoms are particularly useful. In particular, the ozonides of low molecular weight branched aliphatic hydrocarbons have special value. Thus the ozonide of diisobutylene, an octene, is readily accessible, comparatively cheap and is a particularly effective catalyst. Cyclohexene is an example of a cyclic, aliphatic olefin whose ozonide has been found useful. The ozonides of benzene and other aromatics have value but in general are less soluble in organic solvents and except for those liquid under handling conditions therefore are less easily introduced into the polymerization system. Nitrile, carboxyl and esterified carboxyl groups may be present in the unsaturate which is ozonized; for example, the ozonides of acrylonitrile, acrylic acid and acrylic esters have been found useful. Likewise ozonides of heterocyclic compounds, as for example, furane, bring about the desired polymerization.

Usually the ozonide is prepared in a solvent, for example, iso-octane, n-heptane, cyclohexane, ethyl acetate or the like because many of the ozonides are viscous materials in the absence of a solvent. However, ozonides prepared without the use of the solvent are also useful in the present invention, and it is an advantage of operation according to our invention that the catalysts can usually be handled entirely as liquids and thus are specially adapted to completely continuous processing and close control of quantities proportioned to the system. The ozonide may be dissolved in a suitable solvent for addition to the polymerization system after the unsaturate has been ozonized. For this purpose, benzene, cracked polyethylene oil (an oil obtained by cracking polyethylene at elevated temperature), tertiary buty alcohol, water, diethyl ether or dioxane, for example, may be used.

The proportions of the ozonide catalyst to be used depends somewhat on the combined ozone content of the catalyst. The proportion of combined ozone may vary from 1 to 30%, and the proportion of catalyst should be in the range of from about 0.1 to 5%, based on the ethylene charged. Where the combined ozone content is low the proportion of ozonide is increased and where it is high the proportion may be decreased. In general, the combined ozone content should be in the range of about 0.01 to 1.5% of the ethylene charged. The proportion of solvent used to dissolve the ozonide will be determined to a large extent by its solubility in the solvent chosen. Other factors determining the choice of solvent are the characteristics of the solvent with respect to the polymerization product; i. e., whether it is useful as a slurrying medium to assist product removal, the ease of separating it from the product, or whether in the case of the higher boiling solvents residual solvent will exert a beneficial plasticizing action.

The use of various ozonides and solvents is indicated by way of illustration in the following examples in which however the operating conditions and procedures are not intended as limiting.

*Example I*

A stainless steel autoclave was charged with 147 parts by weight of oxygen-free ethylene and 0.7 part by weight of the ozonide of diisobutylene containing 12.9% of combined ozone and dissolved in four times its weight of n-heptane. After 9 hours at 100° C. under pressures of 9400–6100 p. s. i., the batch was cooled to essentially room temperature and the excess ethylene and heptane were removed leaving a residual tough polyethylene polymer having a melting point of 114–116° C., representing a 20.4% conversion of the ethylene charged.

Similar results were obtained when, in addition, 10 parts by weight of tertiary butyl alcohol, water, cyclohexane, benzene, diethyl ether or dioxane were added to the charge in separate runs.

*Example II*

The autoclave was charged with 81 parts by weight of oxygen-free ethylene and 2 parts by weight of diisobutylene ozonide containing 7.5% of combined ozone. After a 5-hour reaction period at 150° C. under a pressure of 3900–3520 p. s. i., the batch was cooled and the unreacted ethylene released. Seventeen parts by weight, representing a 21% conversion of the ethylene charged, was converted to a hard brittle wax having a melting point of 95–102° C.

*Example III*

A stainless steel autoclave equipped with agitator was charged with 400 parts by weight of oxygen-free ethylene, 250 parts by weight of water, 220 parts by weight of benzene and 2 parts by weight of the ozonide of diisobutylene containing 17.07% combined ozone. After 9 hours at 94–113° C. and an initial pressure of 14,000 p. s. i. which fell off to 3750 p. s. i. during the course of the reaction, the batch was cooled, the excess ethylene gradually released and the water-benzene mixture was removed. Seventy-four parts by weight, representing an 18.6% conversion, of a tough plastic polyethylene polymer having a melting point of 114–117° C. was obtained.

*Example IV*

Commercial polyethylene plastic was heated under atmospheric pressure at a temperature of 340° F. for 3 hours. The distillate of cracked polyethylene was an oily liquid having an iodine value of 112. It was ozonized as a 25% solution in iso-octane and the iso-octane was subsequently removed. The ozonide contained 4.56% of combined ozone. Approximately 2 parts of the ozonide was charged to the autoclave with 85 parts of ethylene and heated at 170° C. under 4450–4300 p. s. i. for 18.5 hours. On removing the excess ethylene the residual polymer represented a conversion of 5.3% based on the ethylene charged.

*Example V*

The ozonide of cracked polyethylene, described in the preceding example was charged to the autoclave with ethylene in the proportion of 2 parts of ozonide to 80 parts of ethylene. The contents were heated at 150° C. for about 8 hours under pressures of 4900–4860 p. s. i. The residual polyethylene had a melting point of 95–116° C. and represented a 6.3% conversion of the polyethylene charged.

*Example VI*

A stainless steel autoclave was charged with 81 parts by weight of oxygen-free ethylene and 2 parts by weight of the ozonide of methyl arachidonate containing 5.34% of combined ozone. After 5 hours of reaction at 150° C. and 4600–4460 p. s. i., the autoclave was cooled and the unreacted ethylene gradually released. Three parts by weight of a brittle wax melting at 102–106° C. was obtained.

*Example VII*

To 96 parts by weight of oxygen-free ethylene in a stainless steel autoclave, 2 parts of crotonaldehyde ozonide in ethyl acetate solution was added. Polymerization was carried out at 100° C. and 4450–4320 p. s. i. for a period of 5 hours. Upon opening the autoclave 2 parts by weight of a brittle wax was obtained having a melting point of 105–109° C.

*Example VIII*

An autoclave was charged with 105 parts by weight of oxygen-free ethylene and 0.5 part by weight of the ozonide of 1,1,2,3,4,4-hexachlorobutadiene. After 7.45 hours of reaction at 98° C. and 5600 p. s. i., the batch was cooled and the excess ethylene gradually released. A tough waxy product with a melting point of 109–114° C. was obtained.

*Example IX*

To 104 parts by weight of oxygen-free ethylene in a stainless steel autoclave 0.5 part by weight of furane ozonide containing 4.98% of combined ozone was added. At the end of a 5-hour reaction period at 73° C. and 4600–4430 p. s. i., the batch was cooled and the unreacted ethylene released. The residual polymerized ethylene had a melting point of 110–117° C.

*Example X*

One part of cyclohexene ozonide as a 20% solution in ethyl acetate was charged with 105 parts of ethylene to a stirred autoclave. The mixture was maintained at 70° C. at about 4600 p. s. i. for 5 hours. The polyethylene product had a melting range of 95–108° C.

*Example XI*

One part of ozonide of vinyl chloroethyl ether containing 3.78% of combined ozone was used as catalyst in the polymerization of 81 parts of ethylene at 150° C. and about 4700 p. s. i. for 5 hours. The polymeric ethylene had a melting range of 98–104° C.

*Example XII*

Acrylonitrile was ozonized and 0.4 part of the product was used to polymerize 96 parts of ethylene at 100° C. and 4950 p. s. i. After 5 hours the product separated was found to be a tough waxy product melting at 105–110° C.

*Example XIII*

One part of ozonized methyl methacrylate and 109 parts of ethylene were heated under 5000–4900 p. s. i. at 50° C. for 5 hours. The polyethylene melted at 105–118° C.

We claim:

1. A process for the manufacture of solid homopolymers of ethylene which comprises contacting ethylene under polymerization conditions of pressure and temperature in a high pressure reaction vessel with a small catalytic amount of an ozonide of an ethylenically unsaturated organic compound.

2. The process of claim 1 in which the reactants are continuously charged to the reaction zone, in which the ozonide is continuously proportioned in liquid state and in which reaction products are continuously withdrawn.

3. The process of claim 1 in which the ozonide is an aliphatic ozonide having at least one ozonide grouping to not more than eight carbon atoms.

4. The process of claim 3 in which the ozonide is the ozonide of diisobutylene.

5. The process of claim 3 in which the ozonide is the ozonide of cyclohexene.

6. The process of claim 1 in which the ozonide is an ozonide of a low molecular weight branched aliphatic hydrocarbon.

References Cited in the file of this patent

UNITED STATES PATENTS 2,314,067    Barnett _____ Mar. 16, 1943

OTHER REFERENCES

Houtz: J. Am. Chem. Soc., 53, 1058–1063 (March 1931).